United States Patent [19]

Cho

[11] 4,195,813

[45] Apr. 1, 1980

[54] VALVE

[75] Inventor: Nakwon Cho, Knoxville, Tenn.

[73] Assignee: The United States of America as represented by the United States Department of Energy, Washington, D.C.

[21] Appl. No.: 253,260

[22] Filed: May 15, 1972

[51] Int. Cl.² ............................................. F16K 25/00
[52] U.S. Cl. ................................................... 251/203
[58] Field of Search ............... 251/193, 200, 194, 203, 251/204

[56] References Cited

U.S. PATENT DOCUMENTS

| | | | |
|---|---|---|---|
| 1,133,188 | 3/1915 | Sermon | 251/203 |
| 3,258,244 | 6/1966 | Hilton | 251/203 |
| 3,488,034 | 6/1970 | Masheder | 251/203 |

Primary Examiner—Harvey E. Behrend
Attorney, Agent, or Firm—R. V. Lupo; Stephen D. Hamel

[57] ABSTRACT

A positive acting valve suitable for operation in a corrosive environment is provided. The valve includes a hollow valve body defining an open-ended bore for receiving two, axially aligned, spaced-apart, cylindrical inserts. One insert, designated the seat insert, terminates inside the valve body in an annular face which lies within plane normal to the axis of the two inserts. An elastomeric O-ring seal is disposed in a groove extending about the annular face. The other insert, designated the wedge insert, terminates inside the valve body in at least two surfaces oppositely inclined with respect to each other and with respect to a plane normal to the axis of the two inserts. An elongated reciprocable gate, movable between the two inserts along a path normal to the axis of the two inserts, has a first flat face portion disposed adjacent and parallel to the annular face of the seat insert. The gate has a second face portion opposite to the first face portion provided with at least two oppositely inclined surfaces for mating with respective inclined surfaces of the wedge insert. An opening is provided through the gate which registers with a flow passage through the two inserts when the valve is open. Interaction of the respective inclined surfaces of the gate and wedge insert act to force the first flat face portion of the gate against the O-ring seal in the seat insert at the limits of gate displacement where it reaches its respective fully open and fully closed positions.

1 Claim, 7 Drawing Figures

VALVE

BACKGROUND OF THE INVENTION

The invention relates generally to valves and more particularly to an improved valve which is suitable for use in a corrosive environment. It was made in the course of, or under, a contract with the U.S. Atomic Energy Commission.

Valves made in accordance with the invention are especially intended for use in applications where extremely corrosive process gas is handled. One such application is in connection with gas centrifuge cascades where uranium hexafluoride process gas is used. Isolation valves are needed to provide pressure surge protection to the cascade and to isolate individual centrifuges in the cascade for maintenance and/or replacement. Pressure surge protection is necessary since the failure of a single gas centrifuge could otherwise generate a pressure surge in the process gas which would cause additional machine failures in a domino fashion. Such an occurrence must be guarded against by isolation valves capable of operation after long periods of exposure to the corrosive uranium hexafluoride process gas. Once closed, the valve must provide a continuing leaktight seal to prevent atmospheric contamination of the process gas which is maintained at sub-atmospheric pressure within the cascade.

It is, accordingly, a general object of the invention to provide an improved valve capable of operation in a corrosive environment.

Another object of the invention is to provide a valve suitable for isolating individual gas centrifuge machines in a cascade of such machines operating with uranium hexafluoride process gas.

Other objects of the invention will become apparent from an examination of the following description of the invention and the appended drawings.

SUMMARY OF THE INVENTION

In accordance with the invention, a positive acting valve suitable for operation in a corrosive environment is provided. The valve includes a hollow valve body defining an open-ended bore for receiving two, axially aligned, spaced-apart, cylindrical inserts whose inner walls define a flow passage for process gas. One insert, designated the seat insert, terminates inside the valve body in an annular sealing face which lies within a plane normal to the common axis of the two inserts. An elastomeric O-ring seal is disposed within a groove extending about the annular sealing face. The other insert, designated the wedge insert, terminates in at least two surfaces oppositely inclined with respect to each other and with respect to a plane normal to the axis of the two inserts. An elongated reciprocable gate, movable between the two inserts along a path normal to their common axis, has a first flat face portion disposed adjacent and parallel to the annular sealing face of the seat insert. The gate has a second face portion opposite to the first face portion provided with at least two oppositely inclined wedge surfaces for mating with respective inclined surfaces of the wedge insert. An opening is provided through the gate which registers with the flow passage through the inserts when the valve is in an open position. Interaction of the respective inclined surfaces of the gate and wedge insert act to force the first flat face portion of the gate against the O-ring seal at the limits of gate displacement where it reaches its respective fully open or closed position, thereby ensuring a good seal. At the same time, relatively free movement of the gate is permitted at intermediate displacement positions so that wear and tear on the elastomeric O-ring seal is minimized. In addition, the above interaction acts to protect the elastomeric O-ring seal from the corrosive action of the process gas by forcing the flat face of the gate against the O-ring seal when the valve is in either a fully open or fully closed position.

DESCRIPTION OF THE PREFERRED EMBODIMENT

Figure 1:
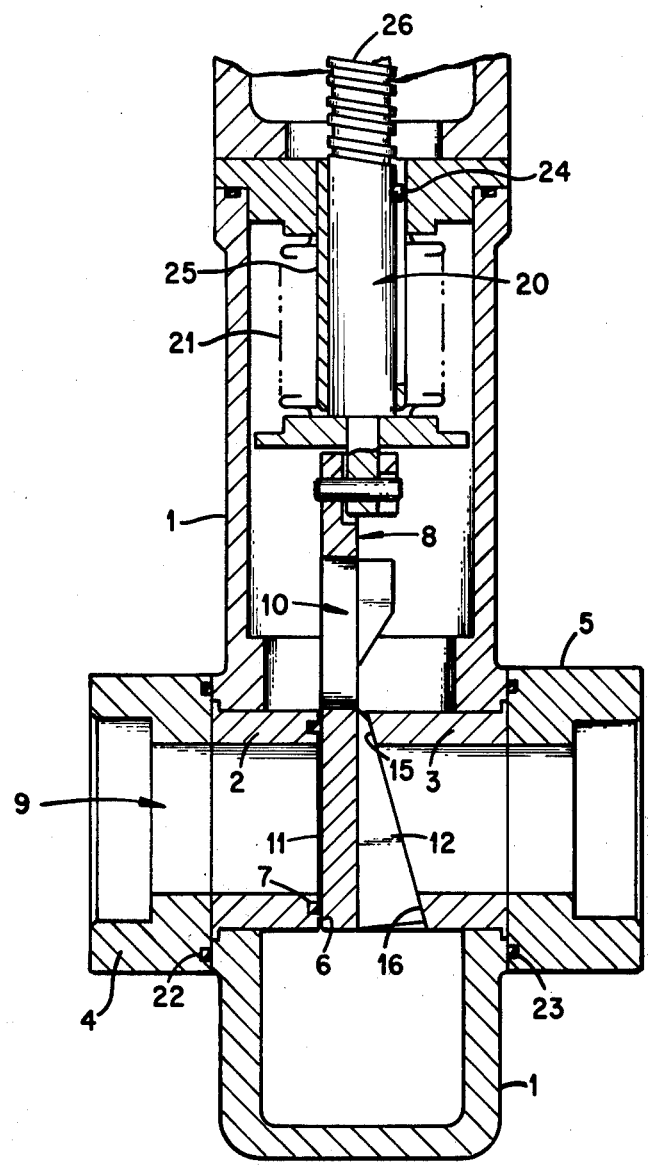
FIG. 1 is a vertical sectional view of a valve made in accordance with the invention.

Referring now to the drawings, initially to FIG. 1 where a sectional view of a valve made in accordance with the invention is illustrated, a hollow valve body 1 is shown fitted with seat and wedge inserts 2 and 3 fixed, respectively, to the inlet and outlet sides of the valve body. Inserts 2 and 3 are generally cylindrical in shape, aligned on a common axis, and attached to respective flanges 4 and 5 for receiving process line piping. Seat insert 2 terminates within the valve body in an annular face 6 which lies in a plane normal to the common axis of inserts 2 and 3. As shown, an elastomeric O-ring seal 7 is disposed in a groove extending about annular face 6. Wedge insert 3 terminates within the valve body in several straight and inclined surfaces which will be described more particularly in a later reference to FIGS. 4 through 7.

Figure 3:
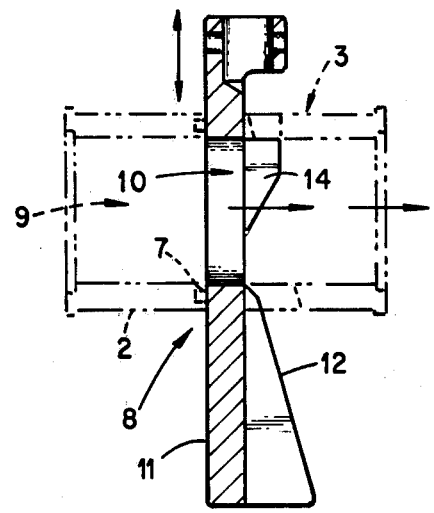
FIG. 3 is a section view of the gate of FIG. 2.
Figure 2:
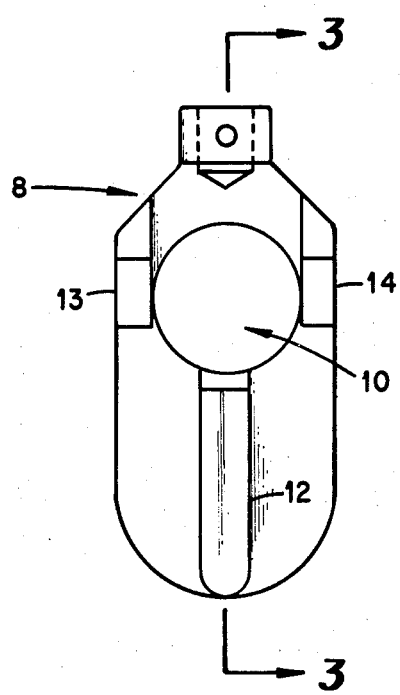
FIG. 2 is a plan view of the gate used in the valve of FIG. 1.
Figure 6:
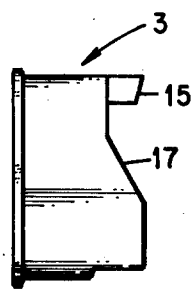
FIGS. 6 and 7 are respective side and bottom views of the wedge insert of FIG. 4.
Figure 4:
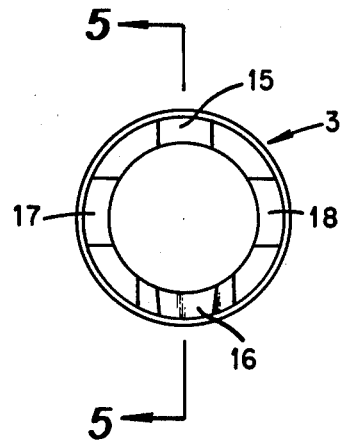
FIG. 4 is an end view of the wedge insert used in the valve of FIG. 1.

Reciprocable gate 8 is adapted to move between inserts 2 and 3 to open or close the flow passage 9 extending therethrough. As shown, gate 8 is in its retracted or "closed" position and passage 9 is blocked. As further shown in FIGS. 2 and 3, gate 8 has an opening 10 extending therethrough which coincides with passage 9 when gate 8 is in its extended or "open" position. FIG. 3 shows the alignment of inserts 2 and 3 and opening 10 when the valve is open. Gate 8 is provided with a flat face portion 11, on its side adjacent and parallel to annular face 6, which presses against O-ring seal 7 when the gate is in its open and closed positions. On the remaining side of gate 8 opposed to flat face portion 11, three raised wedges or inclined portions are provided which co-act with correspondingly inclined surfaces in wedge insert 3. A single, centrally located, raised, closure assist wedge 12 is disposed at the lower end of gate 8. At the upper end of gate 8, two identical wedges 13 and 14 are disposed, respectively, on either side of opening 10. When gate 8 is in an extended or open position as illustrated in FIG. 3, wedges 13 and 14 co-act in concert with correspondingly inclined surfaces of wedge insert 3 (shown in phantom) to force flat face portion 11 of gate 8 against O-ring seal 7. The respective inclined surfaces of wedges 13 and 14, being designed to engage wedge insert 3 when gate 8 is in an extended position, slope in an opposite manner with respect to the sloped surface of closure assist wedge 12, since that wedge is designed to engage wedge insert 3 when gate 8 is in a retracted position as shown in FIG. 1. Thus, gate 8 is designed to reciprocally travel between its open and closed positions where wedges 13 and 14 and wedge 12 respectively engage corresponding surfaces of wedge insert 3 to force flat face portion 11 of gate 8 against O-ring seal 7.

Figure 5:
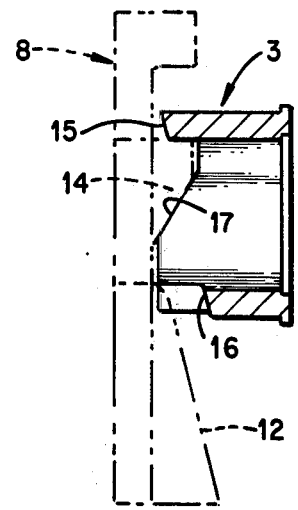
FIG. 5 is a section view of the wedge insert of FIG. 4 with the gate (in phantom) shown in an open position.
Figure 7:
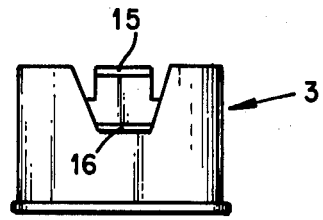

Referring now to FIGS. 4 through 7, wedge insert 3 is shown in several views which illustrate the various surfaces which co-act with wedges 12, 13, and 14 of gate 8. Diametrically opposed tapered surfaces 15 and 16 have a common co-extending slope which corresponds to the slope of closure assist wedge 12. Surfaces 15 and 16 engage closure assist wedge 12 as shown in FIG. 1, forcing flat face portion 11 against O-ring seal 7 when gate 8 is in a retracted position. Two additional tapered surfaces 17 and 18, also diametrically opposed across opening 10, have identical slopes which correspond to the slope of wedges 13 and 14. Surfaces 17 and 18 co-act, respectively, with wedges 14 and 13 when gate 8 is in an extended or open position as illustrated in FIGS. 3 and 5.

The manner in which the subject valve operates can be understood with the aid of the drawings, particularly FIGS. 1 and 3. As shown in FIG. 1, the valve is in a closed position with gate 8 retracted and passage 9 blocked. Positive sealing is effected by the co-action of wedge 12 and surfaces 15 and 16 of wedge insert 3, which acts to force flat face portion 11 firmly against the elastomeric O-ring seal 7 in seat insert 2. To prevent abrasion of the O-ring seal 7 during movement of gate 8 between its open and closed positions, face 11 is coated with polytetrafluorethylene. In addition, gate 8 is mounted to an actuator stem 20 in a position which spaces face 11 a small distance away from O-ring seal 7 when the respective wedges provided in gate 8 are disengaged from wedge insert 3. Thus, movement of gate 8 from its fully extended or retracted position causes it to "spring away" from O-ring seal 7, thereby avoiding abrasion of that seal during such movement.

Additional protection of O-ring seal 7 is provided by designing wedges 13 and 14 to cause less compression of that seal when the valve is in an open position, as shown in FIG. 3, in comparison with the compression provided in its closed position as shown in FIG. 1. Since the valve is intended to remain in an open position during normal cascade operation, it is desired to compress the O-ring seal as little as possible in that position so that effective sealing can be accomplished when the valve is closed and the O-ring seal is compressed to a greater degree. Some compression is needed to keep the process gas from contacting and possibly degrading the sealing portion of the O-ring seal when the valve is open, however.

With the valve in its open position as illustrated in FIG. 3, no attempt is made to effect a seal between gate 8 and wedge insert 3. Gases leaking into the interior of the valve body cannot escape, however, due to the actuator sealing bellows 21 shown in FIG. 1. In addition, respective O-ring seals 22 and 23 are provided between flanges 4 and 5 and valve body 1 to prevent leakage of process gas from the valve body. Bellows 21 is protected against torsional forces during valve actuation by means of an anti-torsion pin 24 fixed to actuator stem 20 which rides in a vertical groove provided in a bellows stop sleeve 25. In practice, overextension or compression of bellows 21 is prevented by gate 8 which limits displacement of actuator stem 20.

Although the valve may be actuated manually in a conventional manner by means of a threaded plunger 26, automatic fast-acting electrical or pneumatic drives are more suitable for cascade operation where essentially instantaneous isolation of disabled centrifuges is needed. Many such drive systems are commercially available and will not be described here.

The above description of one embodiment of the invention is intended to illustrate the invention and should not be interpreted in a strictly limiting sense. For example, the orientation of gate 8 could be reversed and the valve made to open by extending the gate rather than retracting it. Also, it is apparent that the valve is useful in many applications other than the particular one for which it was designed. It is intended, rather, that the invention be limited only by the scope of the appended claims.

What is claimed is:

1. An isolation valve suitable for use in systems using corrosive process gas comprising:
   (a) a hollow valve body having inlet and outlet sides and defining an open-ended bore extending through said inlet and outlet sides;
   (b) a generally cylindrical seat insert defining a flow passage fixed to said inlet side of said valve body within said open-ended bore, said seat insert terminating within said valve body in an annular surface lying substantially within a plane normal to the axis of said seat insert and defining a groove coextensive with said annular surface;
   (c) an elastomeric O-ring seal disposed within said groove;
   (d) a gate having a solid portion, a perforated portion defining an open-ended bore extending through said gate, and a first flat face portion coated with polytetrafluorethylene coextensive with said solid and perforated portions disposed in a plane adjacent to and parallel with said annular surface of said seat insert; said gate being reciprocable to permit said solid and perforated portions to be selectively brought into register with said annular face portion to respectively close and open said valve; and
   (e) a generally cylindrical wedge insert fixed to said outlet side of said valve body within said open-ended bore spaced apart from and in axial alignment with said seat insert, said wedge insert terminating within said valve body in at least two inclined surfaces; and said gate having a second face portion opposed to said first flat face portion and provided with at least two raised inclined surfaces, said raised inclined surfaces of said second face portion respectively engaging said inclined surfaces of said wedge insert when either of said solid and perforated portions of said gate is brought into register with said annular face portion so as to force said first flat face portion against said O-ring seal.

* * * * *